INVENTORS
PAUL-HENRI REBUT
ANTOINE TOROSSIAN

BY William W. Stokes

ATTORNEY ized Sept. 30, 1969

3,470,454
ELECTRICAL GENERATORS, MORE PARTICULARLY FOR DELIVERING ELECTRICAL ENERGY IN PULSE FORM
Paul-Henri Rebut, Versailles, and Antoine Torossian, Bourg-la-Reine, France, assignors to The Commissariat a l'Energie Atomique, Paris, France, an organization of France
Filed Nov. 25, 1966, Ser. No. 597,034
Claims priority, application France, Nov. 26, 1965, 40,005
Int. Cl. H02h 7/06
U.S. Cl. 322—20
8 Claims

ABSTRACT OF THE DISCLOSURE

The generator comprises a rotor and a stator, and delivers a unidirectional pulse, preferably during one-half of a period of the sinusoidal voltage produced, during which time the rotor stops. The generator satisfies the following condition:

$$\Omega^2 \leq \frac{4\phi_0^2}{K(Lu+\alpha N)}$$

where $\Omega$ and $K$ are the speed and moment of inertia, respectively, of the rotor, $\phi_0$ is the stator flux, $N$ is the leakage self-inductance, $\alpha$ is a coefficient whose value is comprised between 1 and 2, and $Lu$ is the self-inductance of the utilization circuit.

---

The present invention relates to generators for delivering electrical energy within a relatively short time, that is to say in the form of a unidirectional pulse, as it is the case in particular to produce very powerful magnetic fields without it being necessary to ensure permanent conditions of delivery (experiments on plasma, in the nuclear power field, etc.).

The chief object of this invention is to provide a system of this kind which is better adapted to meet the requirements of practice, in particular concerning simplicity and efficiency.

The invention consists chiefly in constituting such a generator by an alternating current rotary machine the characteristics of which are calculated, with respect to the impedance of the utilization circuit in which the unidirectional pulse is to be delivered, in such a manner that this delivery causes the machine to stop, or at least to be considerably slowed down within a very short time, in particular lower than or preferably equal to, one half of a period of the sinusoidal voltage that is produced.

According to another feature, in such a machine, the inductor rotor is covered with a cylinder of copper or another metal which is a very good conductor of electricity the length of which is substantially equal to that of the coils of the stator in order to obtain a leakage inductance between the rotor and the stator as low as possible.

According to a third feature of the invention a short-circuiting service is provided in shunt with the utilization circuit so as to make it possible to eliminate residual oscillations.

Preferred embodiments of the present invention willl be hereinafter described with reference to the appended drawings, given merely by way of example, and in which:

FIG. 1 is a diagram illustrating the principle of the invention;

FIG. 2 diagrammatically shows, with more details, an asynchronous generator to be used according to this invention to produce unidirectional pulses in a delivery circuit;

Figure 5:
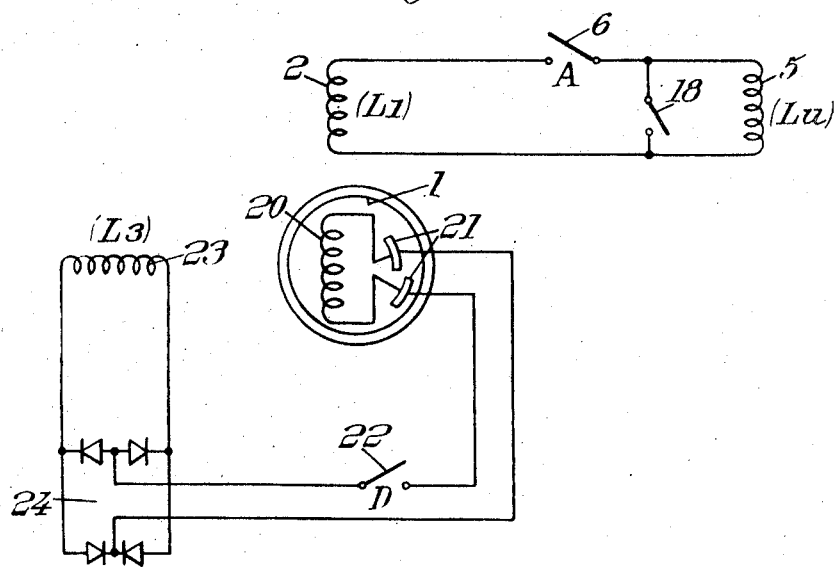

FIG. 5 diagrammatically shows another embodiment of the invention making use of a synchronous generator.

It is known that experiments requiring extremely high electromagnetic fields necessitate ever greater sources of energy, of the order of magnitude of several tens of megajoules, with powers of the order of magnitude of several hundreds of megavoltamperes, but it should be noted that, in such experiments, permanent fields are not necessary and that it suffices to be able to produce unidirectional pulses.

For this purpose, up to the present time, various sources were used such as: capacitor batteries; self inductance means; storage batteries; homopolar rotary machines.

These different solutions involve advantages and drawbacks inherent thereto. It seems that the solution making use of rotary machines, is one of the most interesting However, homopolar machines involve large mechanical losses due to their mercury contacts. Furthermore, these contacts introduce a substantial resistive loss which considerably reduces the voltage. The voltage that is delivered is, anyway, low (of the order of magnitude of 100 v.) which makes it impossible to convey energy beyond some meters and requires cables of very large cross-section.

According to the present invention, use is made of rotary machines of higher efficiency and capable of delivering a higher voltage, which eliminates the above mentioned drawbacks. These machines are generators, the characteristics of which are calculated in such a manner, with respect to the impedance of the utilization circuit, that the machine can be discharged within a short time interval, leading generally to the stopping of the machine, which interval is generally lower than, or equal to, one half of a period.

Of course, these machines must be mechanically such that the rotor can resist, on the one hand, the effects of the centrifugal force during operation and, on the other hand and chiefly, the resistant stresses resulting from sudden stopping at the time of delivery, shock absorbing means being provided for this purpose, both on the rotating portion or rotor and or the stationary portion or stator (the inertia of which will be advantageously utilized for absorbing the shock), such as torque limiting couplings between the driving motor and the rotor.

Means should also be provided for making it possible, when the machine is rotating and supplying a given alternating voltage, to choose, in accordance with characteristics of the utilization circuit, the time of the beginning of delivery with respect to the phase of said voltage.

The machine that will first be described is an asynchronous current generating machine, having a squirrel cage or similar rotor with a large copper cross section, this machine being self-energized by capacitor means.

A machine of this type permits of storing up a high energy (for instance of the order of 1 megajoule or even more) and of giving it up with a high efficiency, losses being very small, in particular if use is made of a massive rotor with a copper lining, as it will be hereinafter described.

Figure 1:
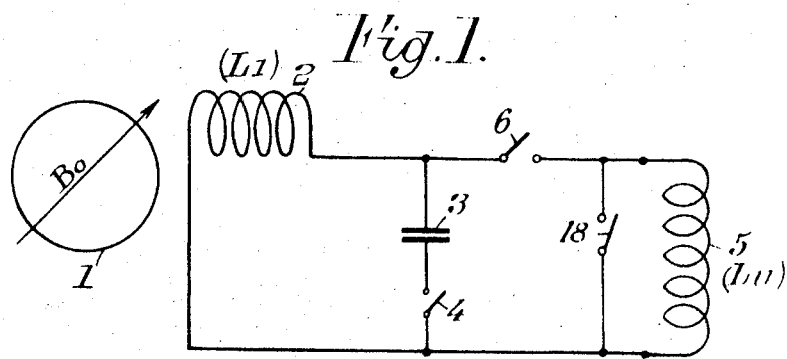

The diagram of such a machine is illustrated by FIG. 1 which shows at 1 the rotor, at 2 the stator pole winding, at 3 the battery of capacitors coupled across the terminals of the stator and operable by a first switch 4, at 5 the utilization circuit into which discharge is produced by the operation of a second switch 6. Furthermore, a short-circuiting device 18 is provided in shunt with circuit 5, in particular to permit of short-circuiting the machine at the end of the discharge and thus of absorbing the residual oscillations.

Figure 2:
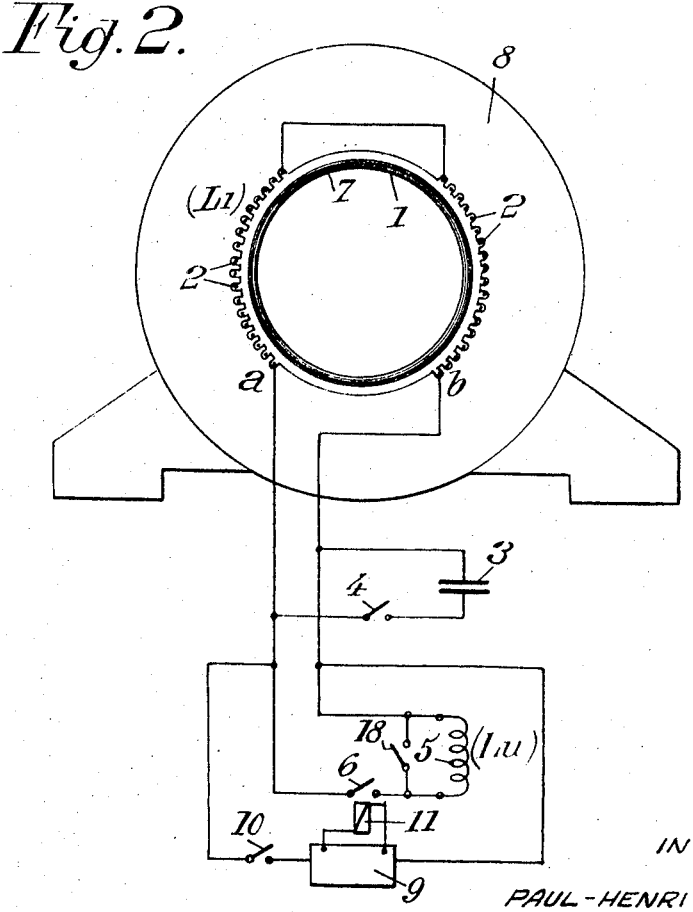

FIG. 2 shows a machine made according to this diagram, wherein rotor 1 is made of a solid steel piece covered with a layer of copper 7 of the order of one centimetre. It might also be constiuted by a squirrel cage or big coils short-circuited on themselves.

The length of this copper layer 7 is substantially equal to that of the coil 2 of the stator so as to reduce the leakage self-inductance as much as possible.

Stator 8, made of laminated magnetic sheets, is provided with a coil 2 distributed into two (or more) poles for instance having twenty turns, the alternating voltage during the operation appearing at the terminals $a$ and $b$ connected, as above stated, to capacitor battery 3 and to the utilization circuit through switches 4 and 6.

Figure 4:
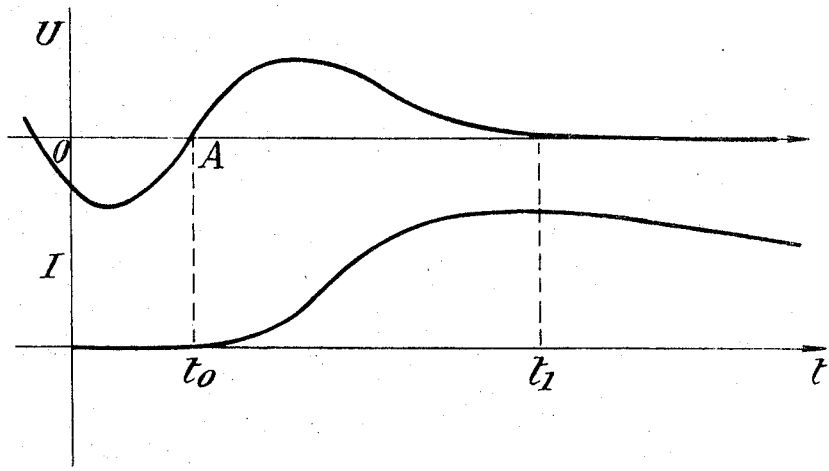
FIG. 4 is an explanatory diagram.

Having thus described an embodiment of the invention, the conditions of operation of such a system will now be disclosed with reference to FIGS. 1, 2 and 4. It will be supposed that, for obtaining an intensive magnetic field in a large size coil 5, the load has essentially a self inductance character, the self inductance of coil 5 being represented in what follows by $Lu$ and that of the stator by $L1$. A different load would slightly modify the formulas but the general behavior would remain substantially the same.

Therefore, according to the invention and as shown by the diagram of FIG. 4, the utilization current must be branched at time $t_0$ (preferably corresponding to a voltage U equal to zero in the machine) and, owing to a suitable relation between the characteristics of the machine and self inductance $Lu$, the whole of the kinetic energy of the machine must be transformed into load current I in the utilization circuit before the direction of voltage U across the terminals of the stator is reversed. In other words the delivery must take place within a half period corresponding to the time interval from $t_0$ to $t_1$. Contact 18 will be closed if necessary to short-circuit the generator so that it no longer has any effect on the utilization circuit.

Anyway it will be noted that the maximum efficiency of the generator is obtained when the time of closing $t_0$ of switch 6 corresponds to a zero voltage and when the rotor stops at time $t_1$ for which the voltage again becomes zero (that is to say after one half revolution for a two-pole machine). Besides it should be noted that when the stoping of the machine is obtained exactly when the voltage is zero, short-circuiting at 18 is not necessary.

Now, it has been found that the essential condition to be complied with according to the invention is as follows:

$$\Omega^2 \leq \frac{4\phi_0^2}{K(Lu+\alpha N)} \qquad (1)$$

wherein $\Omega$ is the speed of rotation of the rotor at time $t_0$ (time of closing of switch 6 to connect the generator with the utilization self inductance 5, of a value equal to $Lu$),
$\phi_0$ is the total flux of the machine seen from the stator,
K is the moment of inertia of the rotor,
N is the leakage self induction with respect to the stator, and
$\alpha$ is a coefficient taking into account the resistance of the generator and of the utilization circuit.

It is known that the leakage inductance N is of the order of magnitude of $$N = L1 - \frac{4M^2}{L2} \qquad (2)$$

where L1 and L2 are respectively the self inductance on no load of the stator and of the rotor, respectively, and M is the mutual inductance between these two self inductances.

On the other hand, concerning $\alpha$, its value may vary between 1 with the resistances are zero and 2 for resistances in the generator due to the "skin" effect and corresponding to the "skin thickness."

For a given self inductance $Lu$, the energy E that can be collected in the form of a single pulse is given by $$E = -\frac{2\phi_0^2 Lu}{(Lu+\alpha N)^2} \qquad (3)$$

E is maximum for $Lu \simeq \alpha N$ that is to say $$E_{\max.} = \frac{\phi_0^2}{2\alpha N} \simeq \frac{\phi_0^2}{4N} \qquad (4)$$

This last formula shows that it is of interest to increase as much as possible the inductor flux $\phi_0$ and to reduce N. These two requirements will partly define the characteristics of this generator.

Anyway it will be noted that such generators make it possible to obtain high power unidirectional pulses without any sliding contact commutation, that is to say without any operation other than the closing of a switch.

For this purpose, it is first necessary to have a leakage self inductance N of very small value, in particular by making use of the above mentioned copper layer 7 on the rotor, or of a suitable squirrel cage. On the other hand, use is made, on the stator, of a winding 2 of the type constituted by a single layer.

Secondly, it is necessary to have a value of the induction magnetic field as high as possible. Therefore flux $\phi_0$ must be maximum. Consequently, use will be made of induction magnetic fields of very high values, of the order of magnitude of 27,000 Gauss, which corresponds to a very high iron saturation (mean $\mu$ equal to 5).

The creation of the induction magnetic field will require currents of high intensity which it will suffice to supply for a short time, for instance less than one second. The necessary energy, which is rather considerable, may advantageously be collected from the kinetic energy of the rotor. Use will be made for this purpose of self excited machines, the operations taking place one after each other in the following order:

(a) Starting of the machine on no load without energizing and rise of the speed to a value higher than the critical speed corresponding to the utilization self inductance (as defined by Formula 1);

(b) Uncoupling from the motor which has served to drive the generator, self excitation being then produced by closing switch 4, until the speed has dropped down to the critical value that has been chosen;

(c) Connection of the load with the generator through switch 6;

(d) Short-circuiting by means of switch 18 of the generator when the rotor is practically stopped (this operation being not essential but making it possible to eliminate a residual oscillation).

For self excitation there are several possibilities corresponding to the machine that is chosen.

If, as above supposed, use is made of an asynchronous generator, self excitation is produced by a set of capacitors 3 of a capacity equal to C.

In order to obtain self excitation, the speed of rotation $\Omega$ chosen for the generator must be higher than the natural frequency $\omega$ of the system: i.e.

$$\Omega > \omega$$

where $$\omega^2 = \frac{2}{L1C}$$

The magnetic field increases exponentially as long as the slowing down is small and there is no saturation. The maximum magnetic field is given by $$\Omega^2 \cdot L1(Bo) \cdot C = 2 \qquad (5)$$

The generator then comprises, outside of the external circuits, no other windings than those of FIG. 2.

In order to obtain self excitation, the set of capacitors 3 is therefore brought into circuit by closing switch 4 as soon as condition (4) has been complied with. The magnetic field Bo then increases, starting from a small remanent field.

But the present invention also applies to synchronous generators, as shown by way of example by FIG. 5.

In this case the generator comprises two supplementary windings.

First the rotor includes, under the squirrel cage, a winding 20 fed with direct current and serving to create the induction magnetic field Bo. The current in said winding 20 flows through two rings 21 and is fed, through a switch 22, from a supplementary winding 23 (L3) of the alternator, with the interposition of a current rectifying device 24.

The invention also includes the following supplementary features.

It has been stated above that it is suitable to choose time $t_0$ to correspond to the point A where voltage U is equal to zero.

Therefore means will be provided for closing switch 6 in suitable phase relation.

Figure 3:
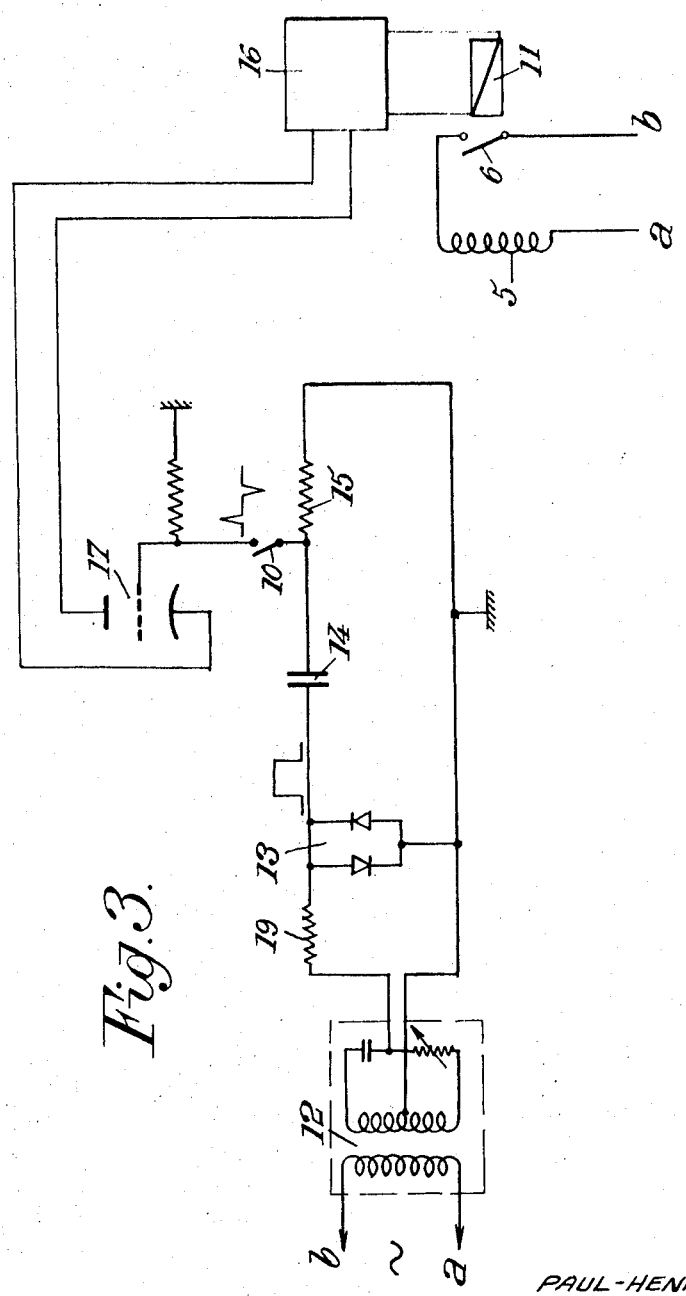
FIG. 3 is a diagram of a synchronizing device to be inserted in a system of FIG. 2.

Such means, diagrammatically illustrated at 9 in FIG. 2 and operated by the closing of an auxiliary switch 10 in order to close switch 6 through a relay 11, will include for instance as diagrammatically shown by FIG. 3:

A variable phase shifter 12 inserted across the terminals of the generator, a resistor 19, a system of diode limiters 13 making it possible to clip the tops of the sinusoid and a differentiating system 14, 15, the whole making it possible to obtain a given phase shift, then, from the phase shifted sinusoid, pulses corresponding to the voltage zeros, A switch 10 making it possible to control the passage of said pulses toward the grid of thyratron 17 and A clockwork mechanism 16 controlled by thyratron 17 and capable, on reception of the first pulse, of operating, through relay 11, switch 6 with a suitable and finely adjustable phase shift.

Means of a similar type might be used for closing switch 18 in due time when such a switch is provided.

The operation of the system according to FIG. 2, is as follows:

Rotor 3 is run to the chosen speed V, higher than the resonance frequency of the circuit constituted by the self inductance (on no load) of the stator and the capacity C of the set of condensers, said condensers being not in circuit (switch 4 open).

Then switch 4 is closed which ensures self excitation, the reciprocating voltage being produced across terminals a and b.

Finally switch 10 is closed to produce the discharge into the utilization circuit 5.

The components having been suitably calculated and the discharge taking place within a very short time the machine stops.

In the case where a residual speed would remain, it is possible as above indicated to short-circuit the generator by means of relay 18 when the current pulse passes through zero, in order to avoid residual oscillations.

It is thus possible to discharge very high powers in the form of a pulse, which truly complies with the desired purpose of the invention, and this with a good efficiency, the self inductance and internal resistive losses being low.

Account should also be taken of the strength and simplicity of construction (absence of sliding contacts in the power circuit and absence of sliding contact commutation, the system including only switches to be closed when the voltage is zero).

The invention therefore applies advantageously to all cases where it is necessary to deliver high powers for a very short time, in particular to create intensive magnetic fields under pulsatory conditions, within large volumes.

Merely by way of indication, the following values are given for a synchronous self excited impulse generator the characteristics of which were as follows:

| | | |
|---|---|---|
| Radius of the rotor | cms | 15 |
| Useful length of the rotor | cms | 90 |
| Mass of the rotor | kgs | 800 |
| Total mass | kgs | 5,000 |
| Maximum speed of rotation | r.p.m | 6,000 |
| Number of poles | | 2 |
| Induction of the rotor | G | 27,000 |
| Number of turns of the stator | | 20 |
| Induced voltage | volts | 7,500 |
| Useful energy | kj | 500 |
| Current | A | 70,000 |
| Leakage self inductance (stator) | µh | 50 |

This machine enabled discharges to be made in a self inductance circuit where the self induction was:

$$Lu = 200 \ \mu h$$

Of course the invention is not limited by the unitary power of the individual machines since it is possible to group several of them in series and/or in shunt, for instance in combination with a common set of capacitors. Said machines may be multipolar machines.

In a general manner, while we have in the above description disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. For delivering, into a utilization circuit having a self-inductance Lu, electrical energy in the form of a unidirectional pulse, a system which comprises, in combination:

a mechanically driven alternating current generator including a rotor, a stator and a stator pole winding, said generator being such that, when driven at a speed $\Omega$, the flux $\phi_0$ in the stator and the leakage self-inductance N comply with the following condition:

$$\Omega^2 \leq \frac{4\phi_0^2}{K(Lu + \alpha N)}$$

wherein K is the moment of inertia of the rotor and $\alpha$ is a coefficient having a value comprised between 1 and 2, and switch means for connecting the stator pole winding with the utilization circuit when said generator is running at such a speed $\Omega$, and at a particular time with respect to the phase of the voltage of the generator.

2. For delivering, into a utilization circuit having a self-inductance Lu, electrical energy in the form of a unidirectional pulse, a system which comprises, in combination:

a mechanically driven alternating current generator including a rotor, a stator and a stator pole winding, said generator being such that, when driven at a speed $\Omega$, the flux $\phi_0$ in the stator and the leakage self-inductance N comply with the following condition:

$$\Omega^2 \leq \frac{4\phi_0^2}{K(Lu + \alpha N)}$$

wherein K is the moment of inertia of the rotor and $\alpha$ is a coefficient having a value comprised between 1 and 2, and switch means for connecting the stator pole winding with the utilization circuit when said generator is running at such a speed $\Omega$, said switch means being adapted to be closed when the voltage of the generator is passing through zero.

3. A system according to claim 1 wherein said generator is of the self-excitation type.

4. A system according to claim 1 wherein said generator is of the asynchronous type, with capacitor means for self-excitation, said generator being adapted to be run at a speed higher than the natural frequency $\omega$, which is given by the formula $$\omega^2 = \frac{2}{K 1^2 C}$$

where L1 is the self inductance of the stator on no load running conditions and C is the capacity of said capacitor means.

5. For delivering, into a utilization circuit having a self-inductance $Lu$ electrical energy in the form of a unidirectional pulse, a system which comprises, in combination:

a mechanically driven alternating current generator including a rotor, a stator and a stator pole winding, said generator being such that, when driven at a speed $\Omega$, the flux $\phi_0$ in the stator and the leakage self-inductance N comply with the following condition:

$$\Omega^2 \leq \frac{4\phi_0^2}{K(Lu+\alpha N)}$$

wherein K is the moment of inertia of the rotor and $\alpha$ is a coefficient having a value comprised between 1 and 2, and switch means for connecting the stator pole winding with the utilization circuit when said generator is running at such a speed $\Omega$, and at a particular time with respect to the phase of the voltage of the generator, and a switch for short-circuiting said generator stator winding immediately after the end of discharge.

6. For delivering, into a utilization circuit having a self-inductance $Lu$, electrical energy in the form of a unidirectional pulse, a system which comprises, in combination:

a mechanically driven alternating current generator including a rotor, a stator and a stator pole winding, said generator being such that, when driven at a speed $\Omega$, the flux $\phi_0$ in the stator and the leakage self-inductance N comply with the following condition:

$$\Omega^2 \leq \frac{4\phi_0^2}{K(Lu+\alpha N)}$$

where K is the moment of inertia of the rotor and $\alpha$ is a coefficient having a value comprises between 1 and 2, and switch means for connecting the stator pole winding with the utilization circuit when said generator is running at such a speed $\Omega$, and at a particular time with respect to the phase of the voltage of the generator, said generator rotor being covered with a thick copper layer.

7. A system according to claim 1 wherein said generator is of the synchronous type, including a rotor winding, a second stator winding, means for rectifying the current from said last mentioned winding, and means for connecting the output of said current rectifying means with said rotor winding.

8. For delivering, into a utilization circuit having a self-inductance $Lu$, electrical energy in the form of a unidirectional pulse, a system which comprises, in combination:

a mechanically driven alternating current generator including a rotor, a stator and a stator pole winding, said generator being such that, when driven at a speed $\Omega$, the flux $\phi_0$ in the stator and the leakage self-inductance N comply with the following condition:

$$\Omega^2 \leq \frac{4\phi_0^2}{K(Lu+\alpha N)}$$

wherein K is the moment of inertia of the rotor and $\alpha$ is a coefficient having a value comprised between 1 and 2, and switch means for connecting the stator pole winding with the utilization circuit when said generator is running at such a speed $\Omega$, and at a particular time with respect to the phase of the voltage of the generator, and phase shifting means responsive to a pulse delivered from said generator to control said switch means accurately to adjust the closing thereof.

References Cited

UNITED STATES PATENTS

| 3,234,408 | 2/1966 | Camnitz | 307—108 |
| 3,343,070 | 9/1967 | Frysztak | 322—28 X |
| 3,361,953 | 1/1968 | Neval | 322—95 |

ORIS L. RADER, Primary Examiner

H. HUBERFELD, Assistant Examiner

U.S. Cl. X.R.

307—108; 322—91, 95